ered*

United States Patent [19]

Kato et al.

[11] Patent Number: 5,141,381
[45] Date of Patent: Aug. 25, 1992

[54] SAFETY ARRANGEMENT FOR AUTOMATIC WAREHOUSING FACILITY

[75] Inventors: Toshihiko Kato, Inuyama; Takeo Nagaoka, Komaki; Jun-ichi Takemura, Kani; Kazushi Tsujimoto, Kasugai, all of Japan

[73] Assignee: Daifuku Co., Ltd., Japan

[21] Appl. No.: 776,819

[22] Filed: Oct. 15, 1991

Related U.S. Application Data

[62] Division of Ser. No. 615,479, Nov. 19, 1990.

[51] Int. Cl.⁵ ................................. B65G 1/04
[52] U.S. Cl. ..................... 414/273; 414/279; 414/281; 340/644
[58] Field of Search .............. 414/273, 275, 277, 279, 414/281, 282; 191/8; 246/187 A; 340/644

[56] References Cited

U.S. PATENT DOCUMENTS

| | | | |
|---|---|---|---|
| 2,825,050 | 2/1958 | Hausten | 340/644 X |
| 3,387,723 | 6/1968 | Lemelson | 414/273 |
| 3,632,001 | 1/1972 | Richens et al. | 414/661 |
| 3,720,327 | 3/1973 | Snyder et al. | 414/281 |
| 3,800,963 | 4/1974 | Holland | 414/281 X |
| 3,825,130 | 7/1974 | Laphan | 414/281 |
| 4,415,975 | 11/1983 | Burt | 414/273 X |

Primary Examiner—Robert J. Spar
Assistant Examiner—James Keenan
Attorney, Agent, or Firm—Barnes, Kisselle, Raisch, Choate, Whittemore & Hulbert

[57] ABSTRACT

A safety arrangement for an automatic warehousing facility is disclosed. A traveling crane adapted to perform goods take-in and take-out operations is provided which is movable on a path provided between and extending along a plurality of three-dimensional racks arranged in parallel for storage of goods. There is provided a safety arrangement for safeguarding any operator from possible danger when he inadvertently enters the path of crane movement while the crane is in automatic operation, and for preventing the crane from moving when the operator is present within the path of crane movement. The safety arrangement includes a device for stopping the crane when an open / close door of a safety enclosure provided at one end of the crane movement path is opened.

5 Claims, 9 Drawing Sheets

SAFETY ARRANGEMENT FOR AUTOMATIC WAREHOUSING FACILITY

This is a divisional of copending application Ser. No. 07/615,479 filed on Nov. 19, 1990.

FIELD OF THE INVENTION

The present invention relates to a safety arrangement for an automatic warehousing facility.

BACKGROUND OF THE INVENTION

Automatic warehousing facilities are well known which are of the type having a plurality of three-dimensional racks arranged in parallel, a travel path provided between each two adjacent racks and extending along the racks, a traveling crane movably mounted on each travel path to carry out goods take-in and take-out operations, and a station located at one end of each travel path for handling incoming and outgoing goods. In such an automatic warehousing facility, it is required that for maintenance and inspection purposes, or in case of emergency, an operator must enter the travel path of the crane. This poses a serious safety problem. There may be a danger of injury or death if the operator should carelessly step into the travel path when the crane is in automatic operation, or if the crane should start moving on account of misoperation or otherwise when the operator is present in the travel path.

SUMMARY OF THE INVENTION

Accordingly, it is a primary object of the invention to provide a safety arrangement for an automatic warehousing facility which eliminates the above mentioned problems.

In order to accomplish this object, according to a first aspect of the invention there is provided a safety arrangement for an automatic warehousing facility, comprising:
- a crane travel path extending along storage racks,
- a safety enclosure provided with an open/close door which is disposed at one end of the travel path,
- discriminator means which determines whether or not the open/close door of the safety enclosure is in closed condition, and
- control means which permits movement of the crane only when the discriminator means has detected the open/close door being in closed condition.

According to such arrangement, the crane is enabled to move only when the open/close door of the safety enclosure is in closed condition. Therefore, if the operator should open the open/close door accidentally to enter the travel path when the crane is in movement or when the warehousing facility is in an automatic operation mode in which the crane is likely to start moving automatically, the discriminator means detects the opening of the door, whereupon the control means operates to disable the crane from moving. Thus, possible danger of contact or collision of the person entering the travel path with the crane in movement can be prevented. Therefore, in the event that a misoperation should occur such that driving effort is inadvertently applied to move the crane when an operator is present within the travel path, the crane is prevented from moving, the safety of the operator being thus assured.

According to a second aspect of the invention, there is provided a safety arrangement comprising:
- a control panel of a portable size which is to be handled by a crane operator for operating the crane at a suitable distance therefrom,
- said control panel being removably installed on the crane at a position suitable for direct access of the crane operator at a ground site,
- said control panel having an interlock release switch located at a position that is accessible only when the control panel is removed from the the crane, and
- said control panel being inoperative to move the crane unless an interlock is released by the interlock release switch.

According to such arrangement, operation can be carried out while the control panel is mounted in position on the crane. This affords greater operating efficiency as compared with the case in which the control panel has to be carried in hand all the time during operation. The crane cannot be moved when the control panel is present on the crane and, needless to say, this assures good safety. When it is necessary to move the crane, the control panel should necessarily be removed from the crane and carried in hand, and yet the crane operator can position himself at a safe distance from the crane. Therefore, the crane operator can carry out an operation under very safe conditions for moving the crane while walking after the crane with a reasonable distance kept therefrom.

The invention, in its third aspect, provides a safety arrangement comprising:
- a control panel for manually operating the crane which is disposed at one end of the crane as viewed in the direction of movement of the crane,
- first and second operating switches disposed respectively on said control board and at the other end of the crane as viewed in the direction of movement of the crane, and
- means for disabling said crane from at least its moving when one of said operating switches is manipulated.

According to such arrangement, any operator who has entered the travel path of the crane can easily perform a safety operation for disabling the crane from movement. Inasmuch as the crane is disabled from movement by the second operating switch which is located opposite to the crane-operating control panel, there is no danger of the control panel being operated by another operator to move the crane; and therefore operation can be carried out in safety within the crane travel path at the opposite side of the location at which the control board is disposed.

The invention, in its fourth aspect, provides a safety arrangement comprising:
- a vertically movable carriage having transfer means,
- a crane support for guiding the vertically movable carriage,
- a ladder provided on the crane support and having a pair of ladder supports,
- a guide rail formed integrally with at least one of the ladder supports and projecting from the ladder support over its entire length, and
- a safety rope connecting slider up and down movably held in engagement with said guide rail and having a safety rope connected thereto, whereby said slider is automatically locked in position when the safety rope is pulled downward.

According to such arrangement, because of the fact that the guide rail for guiding the slider is integral with at least one of the ladder supports, no particular work is necessary for mounting the guide rail to the ladder. This eliminates the danger of disconnection of the guide rail from the ladder. The one ladder support and the guide rail, in combination, form a highly rugged structure which affords greater safety while providing for reduction in size and weight of the entirety of the ladder with safety attachments.

DESCRIPTION OF THE PREFERRED EMBODIMENTS

Figure 1:
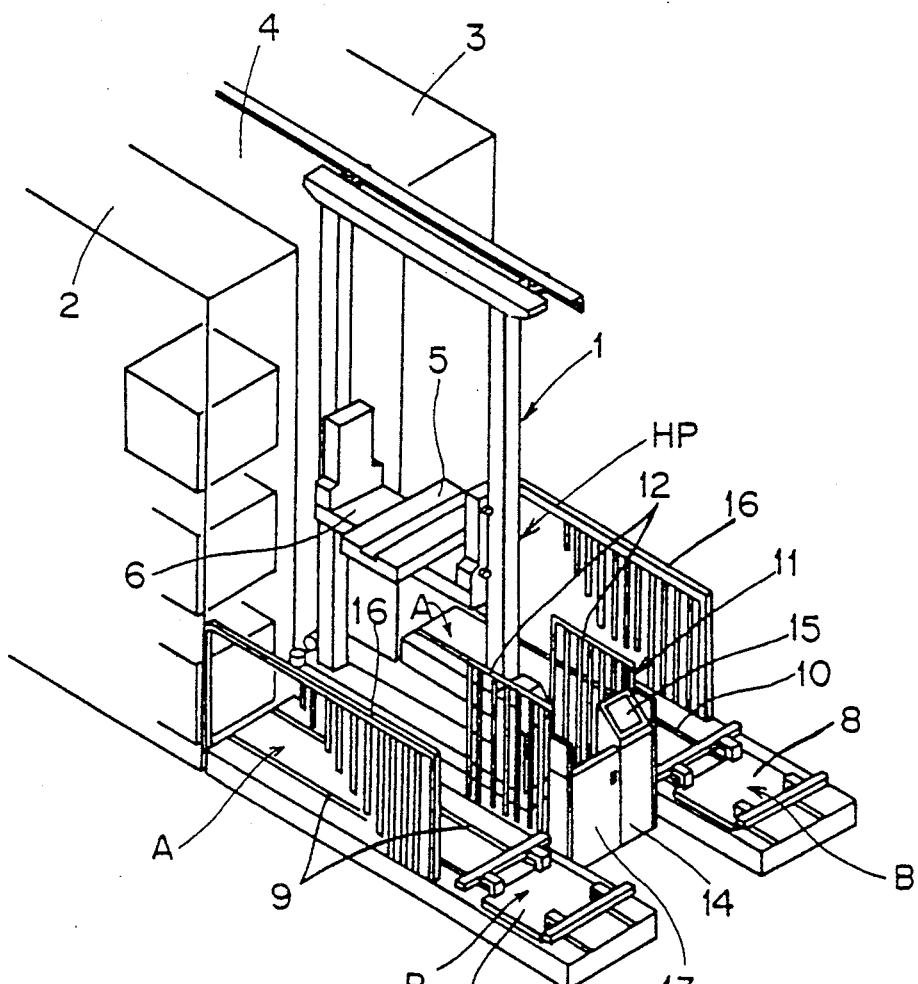
FIG. 1 is a perspective view showing an automatic warehousing facility equipped with a safety arrangement representing one embodiment of the present invention.
Figure 3:
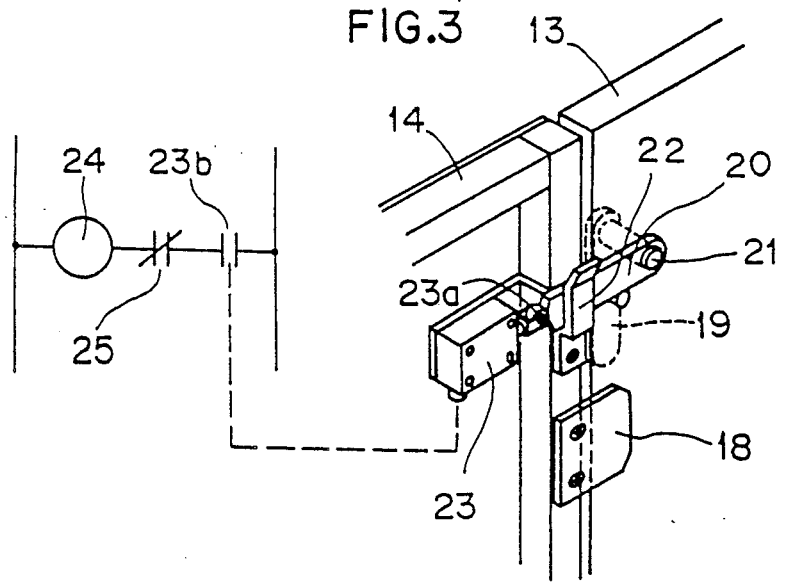
FIG. 3 is a perspective view showing a principal part of the safety arrangement together with a relevant control circuit.
Figure 2:
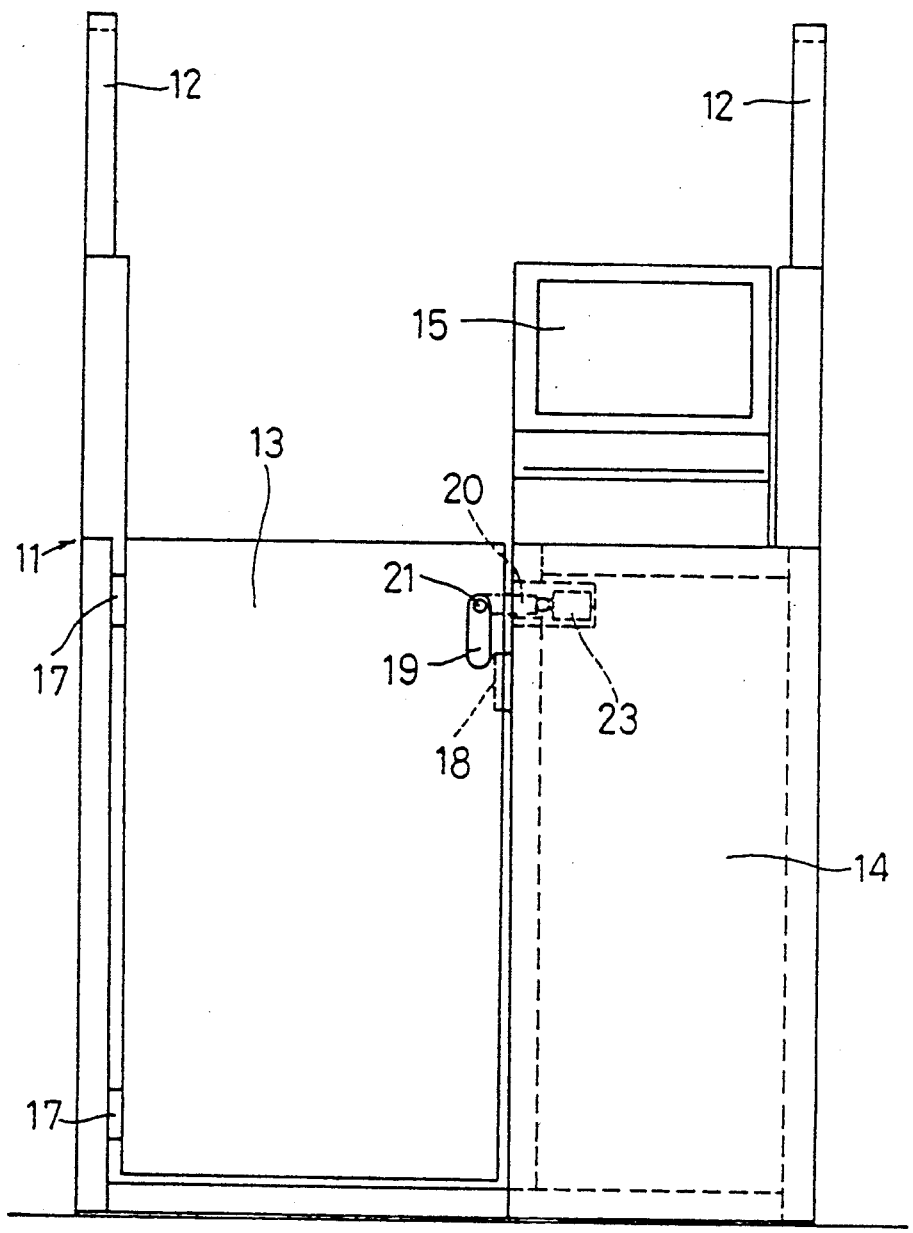
FIG. 2 is a front view of a safety enclosure shown in FIG. 1.

FIGS. 1 to 3 illustrate one embodiment of the invention.

In FIG. 1, numeral 1 designates a traveling crane assigned to carry out goods take-in and take-out operations and movable on a travel path 4 provided between adjacent parallel racks 2 and 3. The crane 1 is of the known type having a vertically movable carriage 6 equipped with transfer means 5, such as a retractable fork. Numerals 7, 8 designate incoming and outgoing goods receiving trucks arranged outside respective one ends of the racks 2, 3 and movable on guide rails 9, 10 between a delivery position A corresponding to a home position HP at one end of the travel path 4 at which the crane 1 stops and another delivery position B spaced apart from the position A.

Numeral 11 designates a safety enclosure which encloses the home position HP side terminal of the travel path 4 in U-shape fashion. The safety enclosure 11 comprises a pair of safety fences 12 at sides, an open/close door 13, and a stationary wall 14. Numeral 15 designates a crane control board mounted on the stationary wall 14, and numeral 16 designates safety fences provided outside travel paths for incoming and outgoing goods receiving trucks 7, 8.

As FIGS. 2 and 3 illustrate, the open/close door 13 is pivotally supported by a pair of hinges 17 at the opposite side of the stationary wall 14 so as for it to be freely opened and closed, and is adapted to be stopped at a closed position by a stopper plate 18 provided at the stationary wall 14 side. Numeral 19 designates an open/close lever rotatably supported at an outer side of the open/close door 13 which is interlockingly connected through a rotational shaft 21 to a lock lever 20 disposed at an inner side. Numeral 22 designates a lock lever locking member disposed at the stationary wall 14 side which is adapted to be engaged by the lock lever 20 for preventing the open/close door 13 when the open/close door 13 is in its closed position at which it is in abutment against the stopper plate 18 and when the lock lever 20 is rotated by the open/close lever 19 in the clockwise direction as viewed in front. Numeral 23 designates a limit switch such that normally open contacts 23b are closed by a plunger 23a being kicked by the front end of the lock lever 20 which is in engagement with the locking member 22 as above mentioned. The limit switch 23 is attached to the stationary wall 14.

The normally open contacts 23b of the limit switch 23 are connected in series to an electromagnetic relay 24 operative to turn on and off power supply to a drive circuit for the crane 1 and to a normally closed switch 25 for emergency stop which is adapted to be opened through emergency stop control, as shown in FIG. 3.

According to the above arrangement, the normally open contacts 23 of the limit switch 23 are closed when the open/close door 13 is locked to its closed position by the lock lever 20. Accordingly, the power on-off electromagnetic relay 24 is excited to connect the drive circuit for the traveling crane 1 to the power supply. Therefore, it is possible to actuate the crane 1 to carry out goods take-in and take-out operations by manipulating the crane control board 15. When the lock lever 20 is rotated counterclockwise as viewed frontways by means of the open/close lever 19 to become disengaged from the locking member 22 whereby to open the open/close door 13, the plunger 23a of the limit switch 23 is moved away from the front end of the lock lever 20 so that the normally open contacts 23b of the limit switch 23 are allowed to open. As a result, the power on-off electromagnetic relay 24 is deenergized and the drive circuit for the traveling crane 1 is disconnected from the power supply, in the same way as in the case where the normally closed switch 25 for emergency stop is opened to bring the traveling crane 1 to an emergency stop. Therefore, the traveling crane 1, if it is in operation, is automatically stopped, and if not in operation, the traveling crane 1 cannot be operated even if the control panel 15 is manipulated.

When the power on-off electromagnetic relay 24 is demagnetized, the traveling crane 1 is disabled not only from moving, but also from performing all other functions including up-and-down movement of the vertically movable carriage 6 and operation of the transfer means 5, because the relay 24 is designed to disconnect, through demagnetization of itself, the driving circuit for the traveling crane 1 from power supply. However, it is possible to arrange that the traveling crane 1 is disabled at least from moving when the normally open contacts 23b of the limit switch 23 are opened.

It is also possible to utilize a proximity switch or a photoelectronic switch for non-contact detection of the lock lever 20 in its locking position with respect to the locking member 22.

As FIG. 1 shows, the safety fences 12, 16 extend in the direction of movement of the crane 1. Therefore, an operator cannot enter the travel path 4 sideways, it being only possible for him to enter through the open/close door 13. Thus, any careless entry into the travel pass can be prevented. The stationary wall 14 and crane control board 15 constitute only a part of the enclosure for the travel path 4. This provides an economical advantage as compared with the case in which the travel path 4 is surrounded completely by an extensive safety fence, with the crane control board 15 disposed separately from the fence. As FIG. 1 shows, the control board 15 is disposed inside the safety enclosure and adapted to be manipulated outside the enclosure. Therefore, workers can, at all times, perform their jobs outside the safety fences. Also, safety fences 16 are provided outside the travel paths for goods receiving trucks 7, 8. This assures safety with respect to the trucks 7, 8 as well.

FIGS. 4 to 7 illustrate another embodiment of the invention.

In the automatic warehousing facility shown in FIGS. 1 to 3, the crane 1 is operated by the control board 15 which is disposed on the ground side. There may be cases where a supplementary control panel is attached to the crane itself to enable the operator to manually operate the crane 1 in case of emergency or during the process of maintenance and inspection.

Such a control panel mounted on the crane 1, as is the case with the main control board 15 disposed on the ground side, has operating buttons and the like for controlling the movement of the crane 1, up and down movement of the vertically movable carriage, and movement of the transfer means. In a small-type crane having no operator's cab, such supplementary control panel has to be disposed at such a position as is convenient for direct control by the operator present on the ground side.

In such type of crane 1, which is to travel within a narrow space of the path 4 defined between parallel racks 2, 3, the supplementary control panel is attached to one end of the crane 1, e.g., the rear end as viewed in the direction of movement thereof. Accordingly, the operator who is to manipulate the control panel should take his position at a location within the travel path 4 and adjacent the rear end of crane 1. In such condition, it is very dangerous to move the crane 1 rearward, that is, toward the operator himself, even if the movement of the crane 1 is limited to a low speed.

In view of this fact, the embodiment shown in FIGS. 4 to 7 is designed so that the crane cannot be actuated to run by the supplementary control panel at the crane side unless the condition of safety is assured.

The safety arrangement for an automatic warehousing facility according to the FIGS. 4 to 7 embodiment will now be described in detail.

Figure 4:
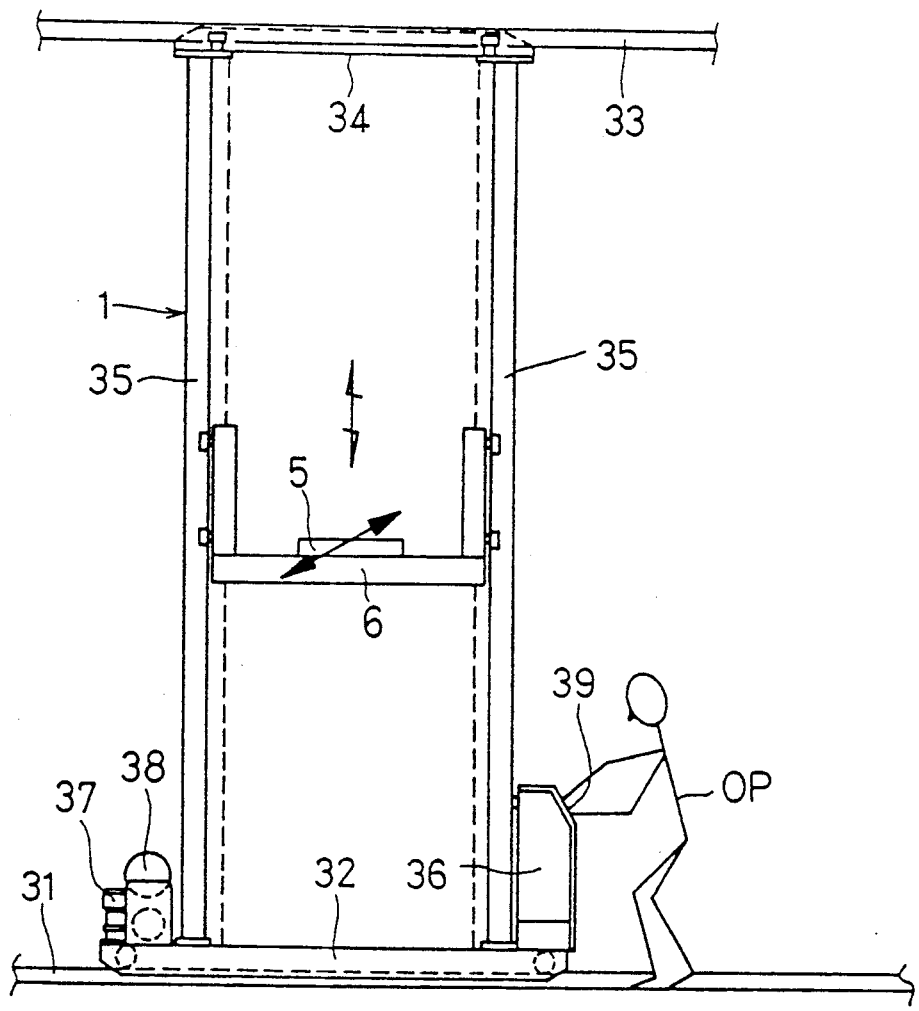
FIG. 4 is a side view showing a crane equipped with a safety arrangement representing another embodiment of the invention, as seen when it is manually operated, with a control panel set in position on the crane side.
Figure 5:
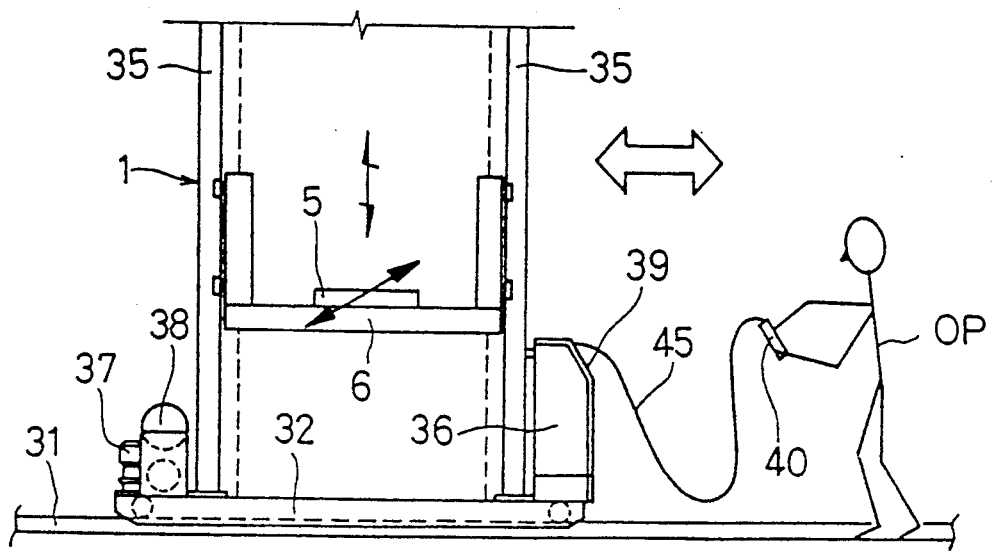
FIG. 5 is a fragmentary side view showing the crane being manually operated by means of the control panel as drawn out from the crane.

In FIGS. 4 and 5, the traveling crane 1, assigned to carry out goods take-in and take-out operations, comprises a lower frame 32 guided by lower guide rails 31 and an upper frame 34 guided by upper rails 33, the two frames 32, 34 being integrally connected to each other through a pair of supports 35 spaced in the direction of movement of the crane 1, and a lift carriage 6 vertically movably supported between the pair of supports 35 and having a transfer means 5 disposed thereon. This type of crane is well known in the art.

Numeral 36 designates a control unit mounted on the lower frame 32 at the rear end thereof which controls a drive unit 37 for moving the crane 1, an up-and-down drive unit 38 for moving the lift carriage 6, and a drive unit (not shown) for moving the transfer means 5. The control unit 36 has a console 39 which faces upward at an angle in the rearward direction.

The console 39 is formed with a recessed portion 41 in which is removably received a control panel 40 of a portable size. Numeral 42 designates a key switch for switching from an automatic operation mode to an inspection mode; numeral 43 designates an indicator lamp which lights during operation; and 44 designates a push-button switch for emergency stop.

The control panel 40 and the control unit 36 are electrically connected to each other by a cord 45 of a suitable length. The cord 45 can be drawn out from a cord hole 46 within the recessed portion 41 as the control panel 40 is removed from the recessed portion 41. Therefore, when the control panel 40 is received in the recessed portion 41, the cord 45 must be inserted into the cord hole 46. For this purpose, provision of an automatic winding device in the interior of the console 39 affords easy insertion of the cord 45. Of course, it is possible to employ a cordless (wireless) type control panel which can transmit a control signal to the control unit 36 through utilization of supersonic waves or light rays.

The control panel 40 is provided with control buttons 47a, 47b for moving the traveling crane fore and aft, control buttons 48a, 48b for moving the lift carriage 6 upward and downward, and control buttons 49a, 49b for advancing the transfer means 5 toward the fences 2, 3. An interlock release switch 51 is provided on a side of the control panel 40 which is hidden from sight when the control panel 40 is received into the recessed portion 41 of the console 39.

The control unit 36 controls individual drive units correspondingly in response to the operation of individual control buttons 47a through 49b on the control panel 40. This control unit 36 has an interlock function which prohibits the control of the drive unit 37 for crane movement by the run control buttons 47a, 47b unless interlock is released by an interlock release switch 51. Therefore, in order to control the drive unit 37 by the control buttons 47a, 47b, the interlock release switch 51 must be operated to release the interlock. The key switch 42 is operated for switching by a relevant key of the main switch used in the main control board 15 on the ground side as shown in FIGS. 1 and 2. Therefore, it is impossible to control operation of the traveling crane 1 by both the main control board 15 on the ground side and the control panel 40 at the same time.

Figure 7:
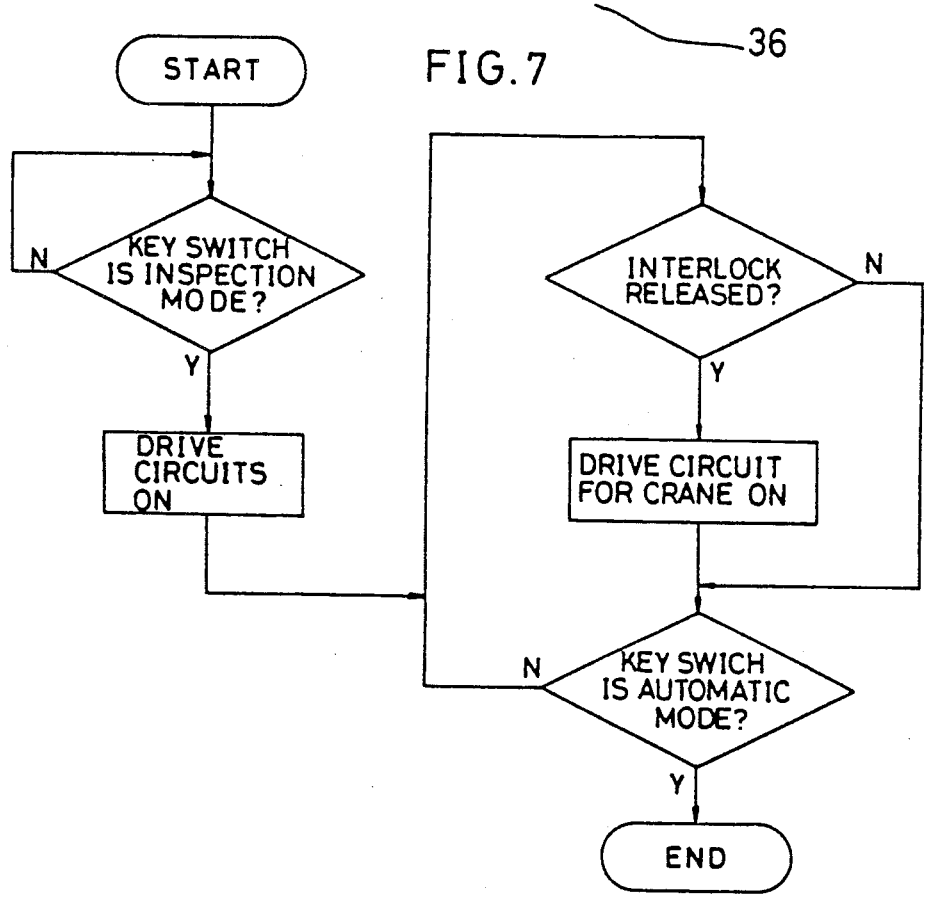
FIG. 7 is a flow chart showing a control procedure with respect to the control panel and console.

As the flow chart of FIG. 7 shows, when the key switch 42 is switched from automatic operation mode to inspection mode by a relevant key, the up-and-down drive circuit and the drive circuit for the transfer means 8 are both actuated. Accordingly, as FIG. 4 illustrates, an operator OP present on the ground right after the control unit 36 of the traveling crane 1 operates control buttons 48a through 49b of the control panel 40 to control the up-and-down drive unit 38 and the drive unit for the transfer means 5 as desired, whereby the lift carriage 6 and the transfer means 5 can be driven as required.

Where it is necessary to move the traveling crane 1, as FIG. 5 shows, the control panel 40 is removed from the console 39 and, with the control panel 40 held in hand at a location which is a safe distance away from the crane 1, the interlock release switch 51 is operated to release the interlock. As a result, the drive circuit 37 for crane run is actuated as FIG. 7 illustrates, and accordingly it is possible to control the drive circuit 37 by control buttons 47a, 47b to move the crane 1 in the desired direction, fore or aft. In this case, needless to say, the crane 1 can be moved at a low speed only. With the control panel 40 removed from position to move the crane 1 in this way, the lift carriage 6 and the transfer means 5 can be driven into movement by operating the control buttons 48a to 49b.

Upon completion of the required operation, the interlock release switch 51 is reset to its initial position at which the interlock mechanism functions, and then the control panel 40 is inserted into the recessed portion 41 of the console 39.

For the interlock release switch 51, a switch of the type which can automatically reset to its initial position upon release of the finger manipulating the switch 51 may be used. This saves the trouble of resetting the interlock release switch 51 to its initial position. It is also possible to provide a circuit arrangement such that interlock is released by one operation of the interlock release switch 51, while the interlock mechanism functions automatically when the key switch 42 is switched back to the automatic operation mode.

The traveling crane 1 can be automatically operated under preset conditions at the ground-side main control board by removing the key of the key switch 42 after being switched to automatic operation mode and using the key to set the main key switch of the ground side main control board to automatic operation mode.

A further embodiment of the invention is shown in FIGS. 8 to 11.

Figure 6:
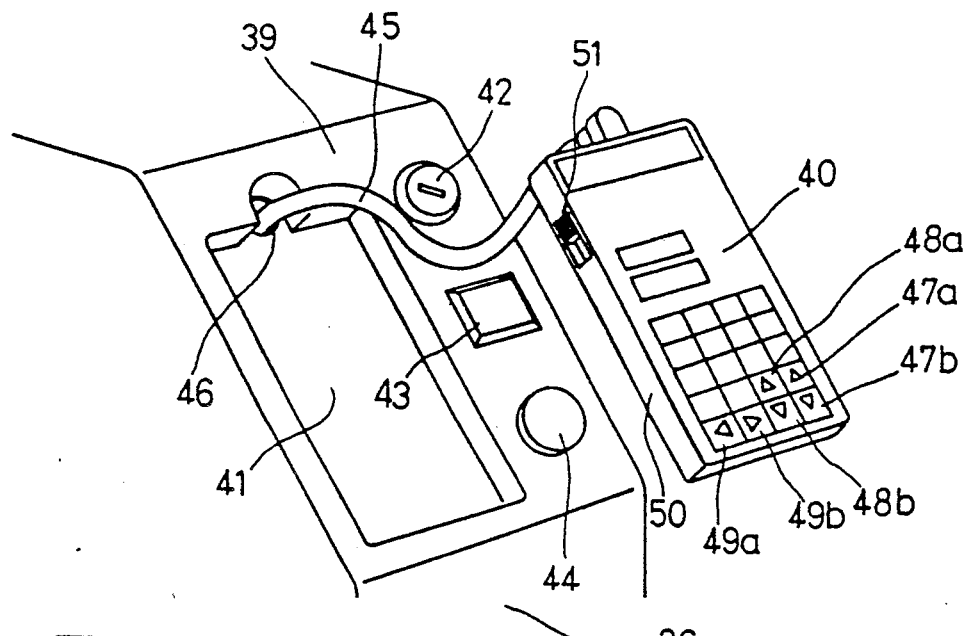
FIG. 6 is a perspective view showing the control panel and a console in FIGS. 4 and 5.

As FIGS. 3 and 6 show, the main control board 15 and the console 39 of the control unit 36 for the crane 1 are provided respectively with the normally closed switch 25 for emergency stop and the push-button switch 44 for emergency stop. If an emergency should occur during operation of the crane 1, the operator can operate the emergency switches 25, 44.

For purposes of maintenance and inspection, an operator may enter the narrow travel path 4 of the crane. In such a case, the emergency stop switches 25, 44 must be operated prior to his entry. However, if another operator enters the travel path 4 at the opposite side of that crane 1 at which is located the control unit 36 for manual crane operation, it is very difficult for the operator to operate the emergency stop switch 44 on the console 39, and it takes time to do so. The operator who is in a position to control the console of the control unit 36 for manual operation has difficulty in finding the presence of another operator in the travel path 4 at the opposite side of that side of the crane 1 at which is located the control unit 36 for manual operation, and may possibly operate the crane 1 without recognizing the presence of the other operator in the direction of movement of the crane 1. This involves a serious danger.

In view of such a possibility, the embodiment shown in FIGS. 8 to 11 is intended to assure safety in case of emergency, if an operator is present in the travel path 4 at either side of the crane 1, fore or aft.

Figure 8:
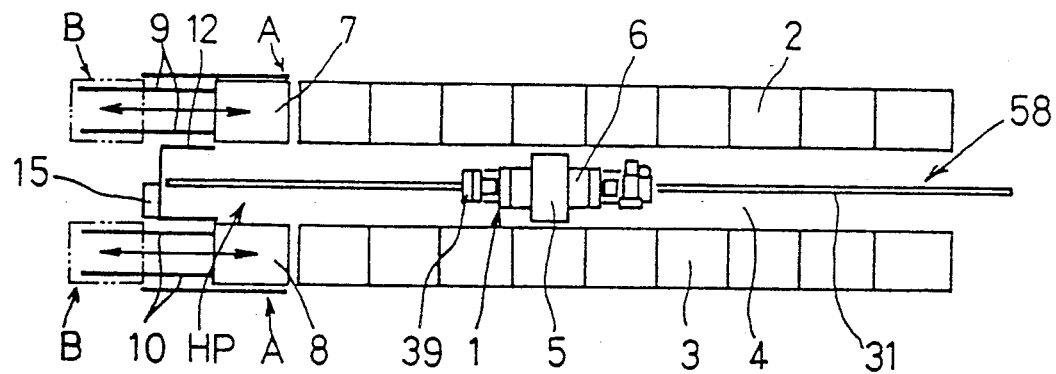
FIG. 8 is a plan view showing an automatic warehousing facility equipped with a safety arrangement representing another embodiment of the invention.
Figure 9:
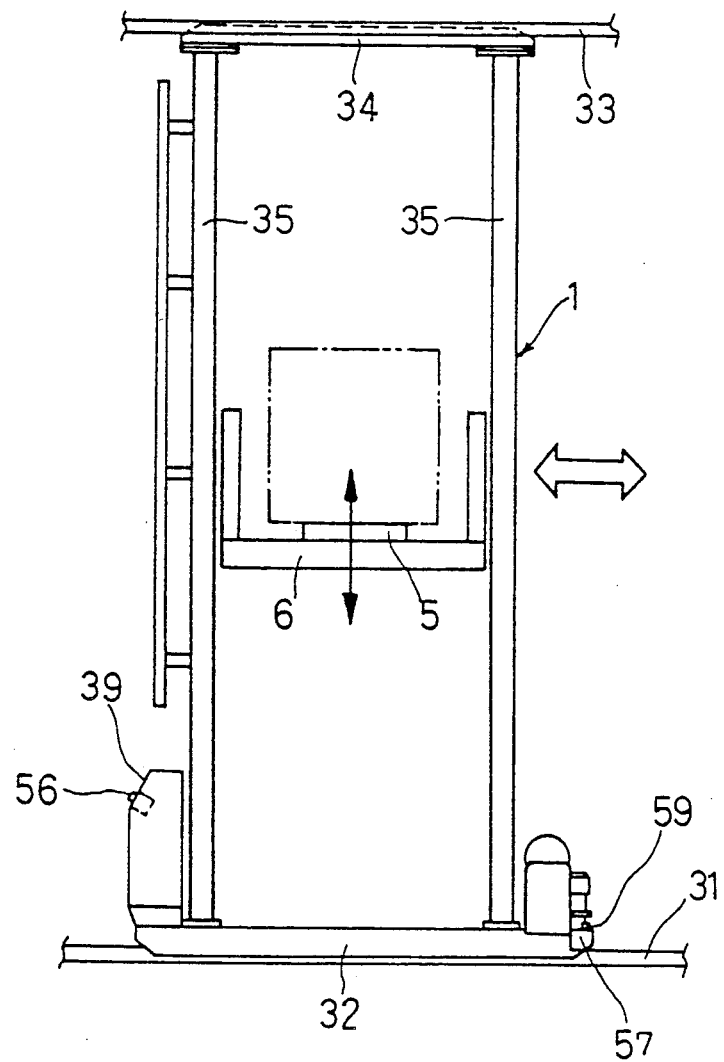
FIG. 9 is a side view showing a crane in the automatic warehousing facility in FIG. 8.

The safety arrangement for an automatic warehousing facility according to the embodiment will be described in detail. In FIGS. 8 and 9, a console for manual operation of control panel 39 similar to the one shown in FIGS. 4 and 5 is provided at the home-position HP side end of the crane 1, the control panel 39 being provided with an emergency stop switch 56. Numeral 57 designates a control box disposed at one end of the crane 1 which is opposite to the home-position side end, that is, at the out-position 58 side end of the travel path 4. An inspection switch 59 is attached to the control box 57.

Figure 10:
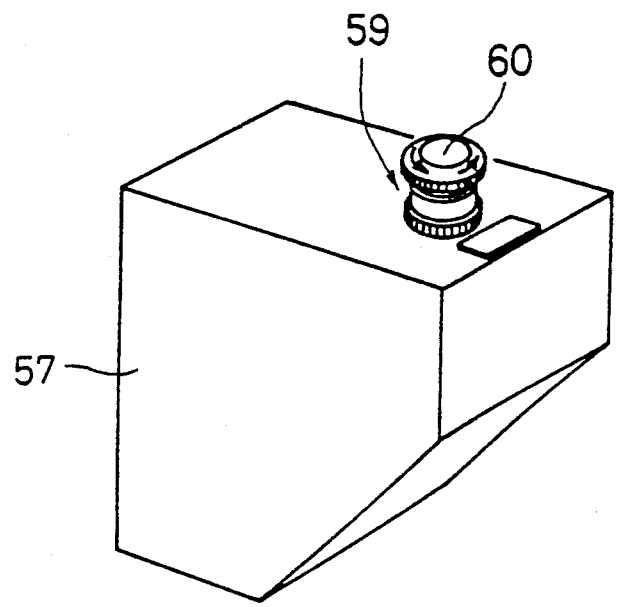
FIG. 10 is a perspective view showing a control box in the safety arrangement of the FIG. 8 embodiment.
Figure 11:
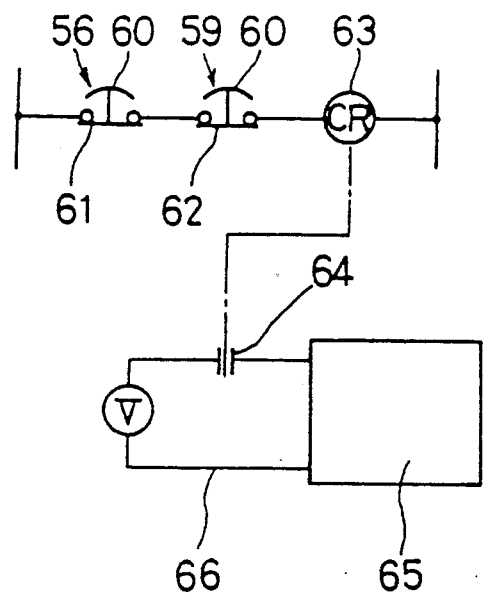
FIG. 11 is a control circuit diagram with respect to the safety arrangement of the embodiment.
Figure 12:
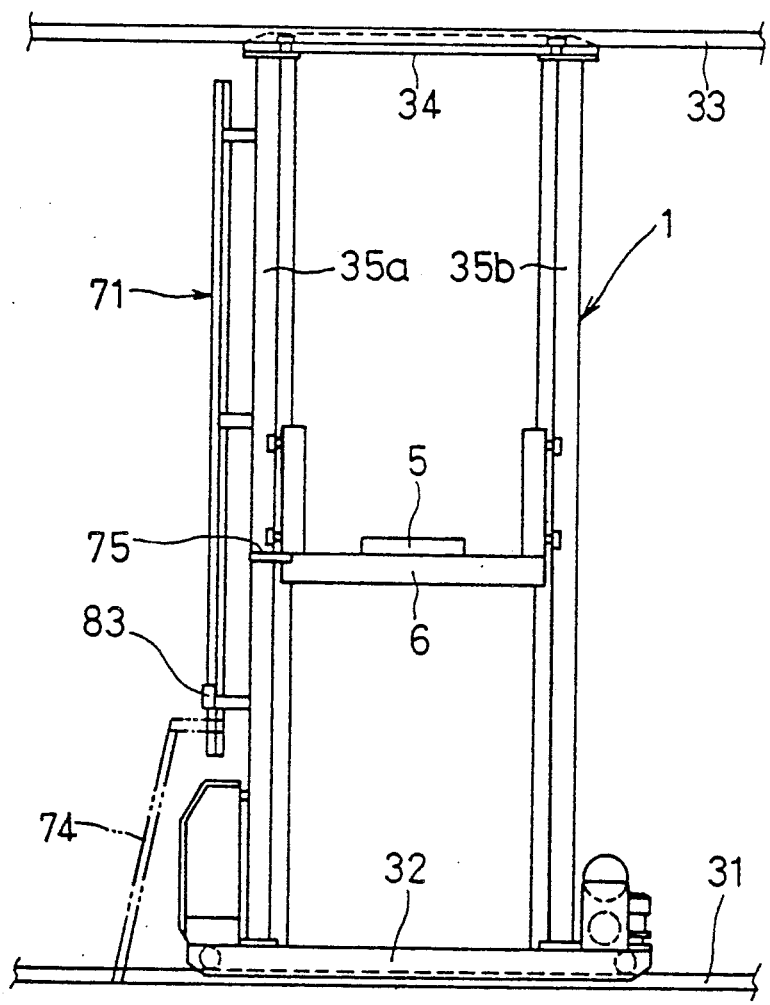
FIG. 12 is a side view showing an operating crane in a further embodiment of the invention.
Figure 16:
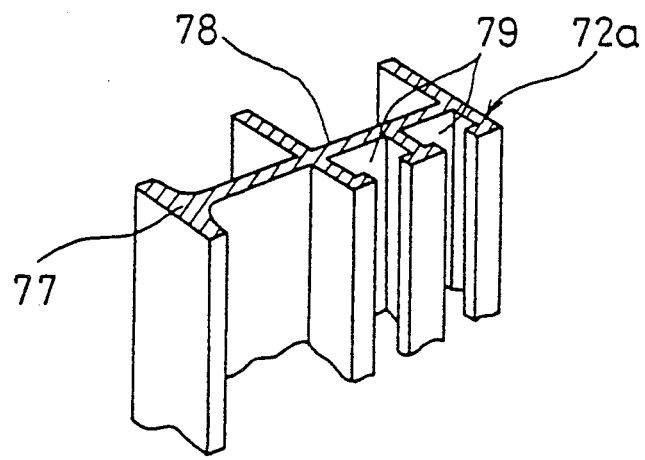
FIG. 16 is a transverse sectional view in perspective showing a ladder support in the ladder.
Figure 13:
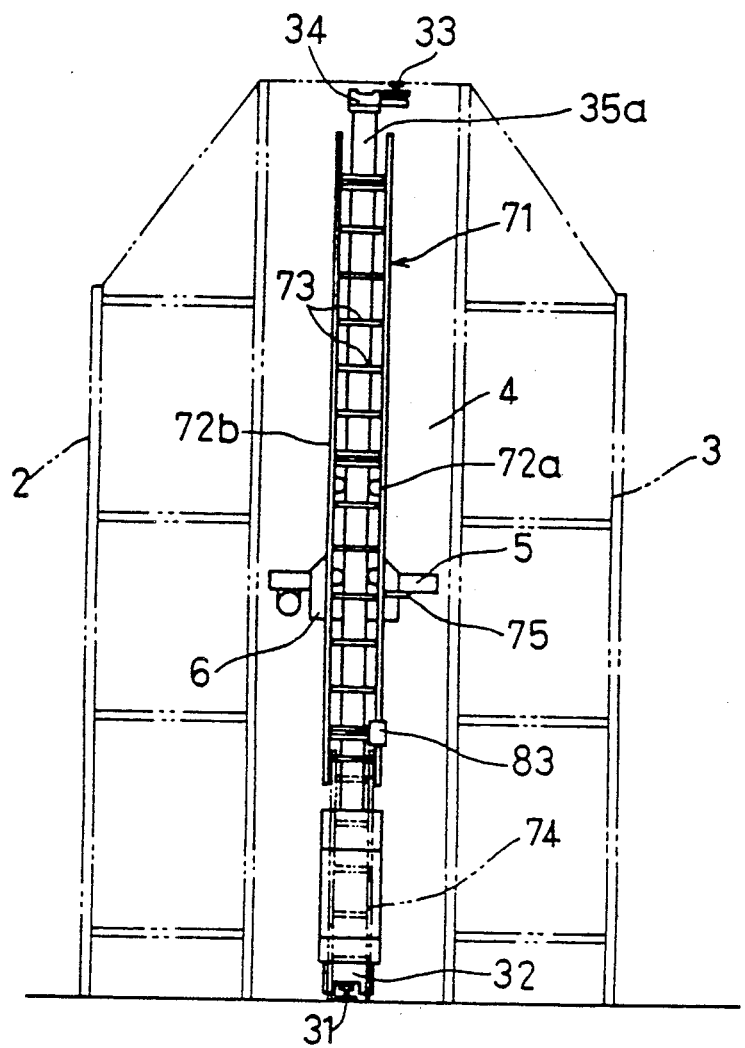
FIGS. 13 and 14 are, respectively, a front view and a plan view showing the crane.
Figure 14:
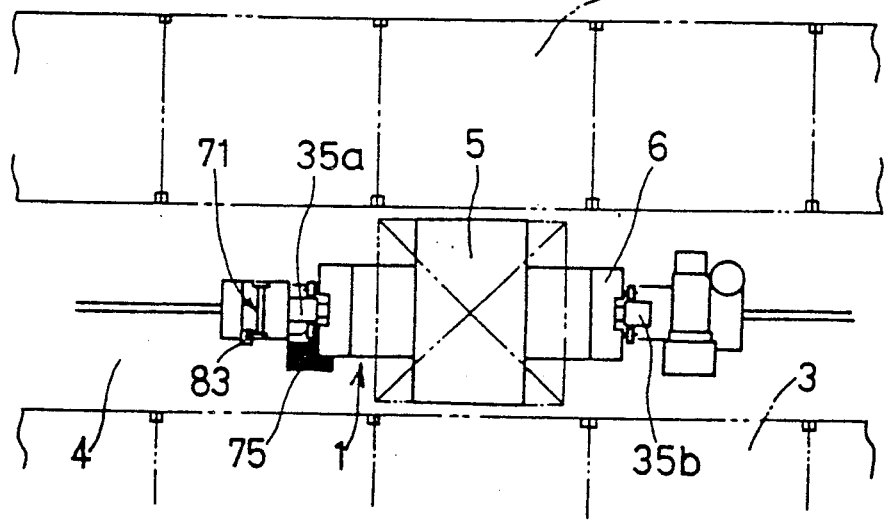
Figure 15:
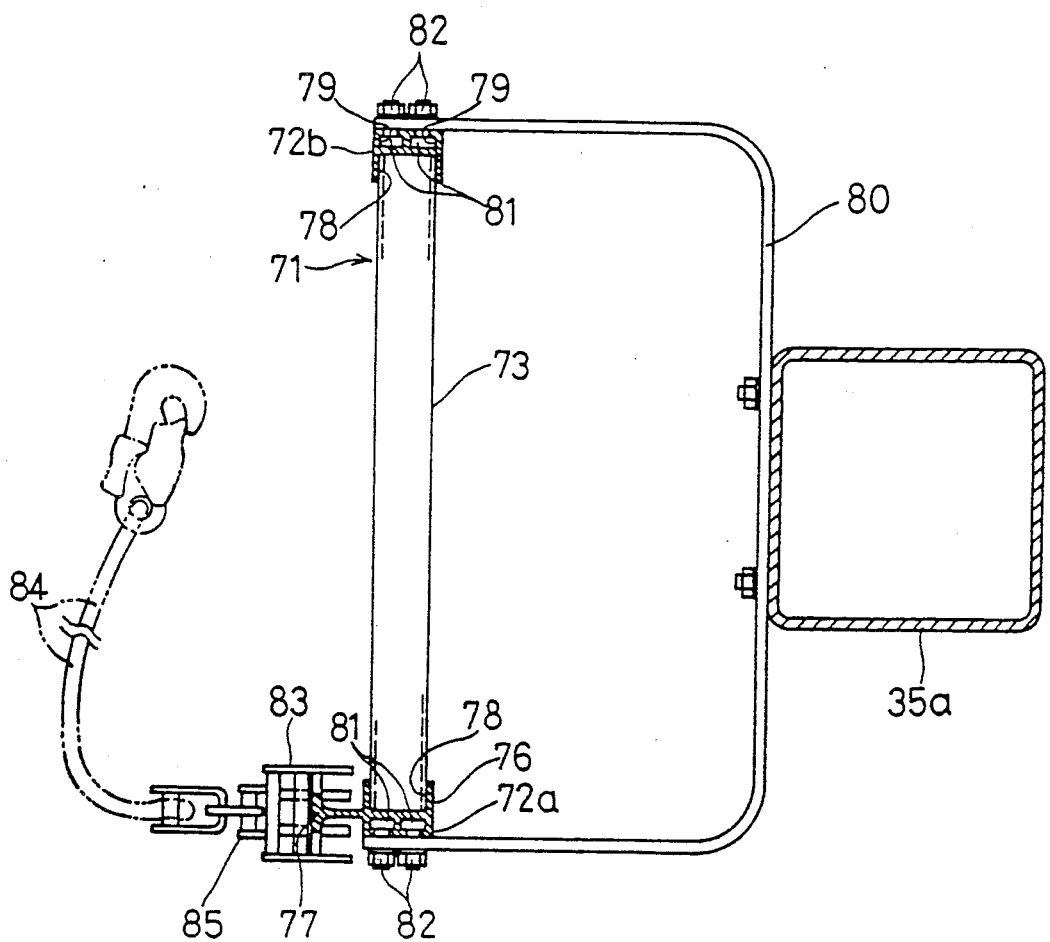
FIG. 15 is a transverse sectional view in plan showing an emergency ladder in the crane.

Both the emergency stop switch 56 and the inspection switch 59 are push-button switches commonly known as push-lock type push button switches, such that, as shown in FIG. 10, when a push button 60 is pushed in, it is automatically locked as pushed in and, when the push button 60 is rotated, the lock is released to allow the button 60 to reset. The switches 56, 59, as FIG. 11 shows, have normally closed contacts 61, 62 which are opened when the button 60 is depressed, the contacts 61, 62 being connected in series to an electromagnetic relay 63. Contacts 64 which are closed upon magnetization of the relay 63 are provided in a power circuit 66 of a control unit 65 of the control board 15 having functions to drive the traveling crane 1 into movement, the lift carriage 6 into up-and-down movement, and the transfer means 5 into movement.

According to the above arrangement, when the emergency stop switch 56 and inspection switch 59 are not in operation, that is, the normally closed contacts 61, 62 remain closed, the electromagnetic relay 63 is excited to close its contacts 64, and accordingly the power circuit 66 of the control unit 65 is closed so that the control unit 65 is allowed to perform its function. Thus, the operator can operate individual control switches of the control panel 39 for manual operation to actuate the traveling crane 1 into movement, the lift carriage 6 into up-and-down movement, and/or the transfer means 5 into movement as required.

In case that an emergency occurs during such manual operation of the crane 1, the push-button 60 of the emergency stop switch 56 on the control panel 39 is depressed into locked position thereby to switch the normally closed contacts 61 into their open condition. As a result, the electromagnetic relay 63 is demagnetized to open the contacts 64, and the control unit 65 is disconnected from the power supply, so that the traveling crane 1 is automatically caused to stop all its operations. When the operator enters the travel path 4 to perform an operation at a location between the crane 1 and the home position HP, he can operate the emergency stop switch 56 on the manual-operation purpose control panel 39 of the crane 1 as above mentioned to disable the crane 1 from all its functions. Thus, greater safety can be assured.

When the operator enters the travel path 4 to perform an operation at a location between the crane 1 and the out position 58, the push button 60 of the inspection switch 59 on the out-position side control box 57 of the crane 1 is depressed to lock in position thereby to switch the normally closed contacts 62 to their open position. Thus, in the same way as the emergency stop switch 56 is operated, the electromagnetic relay 63 is demagnetized to open the contacts 64, and the control unit 65 is disconnected from power supply, with the result that the traveling crane 1 is disabled from all its functions. Therefore, any dangerous occurrence such that another operator inadvertently operates the manual-operation purpose control panel 39 to advance the crane 1 can be effectively avoided.

FIGS. 12 through 16 illustrate another embodiment of the invention.

Generally, a traveling crane for automatic warehousing is equipped with a ladder for enabling the operator to transfer himself onto the lift carriage for emergency and/or maintenance and inspection purposes, though not shown with respect to the embodiments in FIGS. 1 through 11. In order to ensure safety of the operator who goes up and down the ladder, it is desirable to use a safety device for protection against falling, in combination with the ladder. Such a safety device for protection against falling comprises a guide rail and a safety rope connecting slider up-and-down movable engageable with the guide rail and adapted to automatically lock in position when a safety rope connected to the guide rail is pulled downward. The operator and the slider are interconnected by the safety rope.

In order to have such a safety device in combination with the ladder, it is necessary to attach a guide rail, as a safety means, to one support for the ladder. For this purpose, the combined strength of the ladder support and guide rail must be sufficiently high to withstand any great impact that may be applied in the course of automatic locking. Further, the ladder support itself must have reasonably great strength. This requires a large sized ladder, which leads to increased cost.

In view of this fact, the embodiment shown in FIGS. 12 to 16 is intended to provide for reasonable reduction in size and weight of such a ladder equipped with safety means and yet to assure greater safety.

In FIGS. 12 through 16, numeral 71 designates an emergency ladder attached to the outer side of one support 35a of the crane 1. The ladder 71 comprises a pair of supports 72a, 72b, and step members 73 disposed in equal intervals between the pair of supports 72a, 72b. Numeral 74 designates an auxiliary ladder releasably locked to the lower end of the emergency ladder 71, which is removed when it is not needed. Numeral 75 designates a transfer step attached to the lift carriage 61.

The one support 72a of the ladder 71 comprises a step member fixing portion 76 and a guide rail 77 formed integrally with the step member fixing portion 76, the guide rail 77 having a T-shaped sectional configuration. The step member fixing portion 76 is identical with the other support 72b in its entirety, and comprises a U-shaped groove portion 78 to which one end of a step member 73 is fixedly fitted, and a pair of parallel mounting U-shaped grooves 79, a series of such groove combinations being formed over the entire length of the step member fixing portion 76. The ladder 71 is mounted in position by coupling the two supports 72a, 72b to opposite ends of a U-shaped bracket 80 fixed to the crane support 35a, by bolts 81 and nuts 82 in such a way that the heads of the bolts 81 are unrotatably received into the mounting U-shaped grooves.

A slider 83, a known-type safety device for protection against falling, is vertically movably fitted on the guide rail 77. The slider 83 is provided with a safety rope connecting lever 85 to which is connected a safety rope 84. The safety rope connecting lever 85 catches the guide rail 77 as it is pulled downward, so that the slider 83 is locked to the guide rail 77.

When it is necessary that the operator should go up on the lift carriage 6 and/or racks 2, 3 for maintenance and inspection purposes, the auxiliary ladder 74 is connected to the lower end of the emergency ladder 71 of the traveling crane 1 at a standstill. The operator can utilize the auxiliary ladder 74 and emergency ladder 71 to go up and down between the lift carriage 6 and the ground. To go up and down the emergency ladder 71, the safety rope 84 connected to the slider 83 should be locked to a safety belt secured to the operator's waist. By doing so, the operator can be prevented from falling by virtue of the safety rope 84 and slider 84 in the event that he should miss his footing on the ladder stairs, because the safety rope 84 is tightly pulled downward so that the slider 83 is automatically locked to the guide rail 77.

What is claimed is:

1. A safety arrangement for an automatic warehousing facility equipped with a traveling crane adapted to perform goods take-in and take-out operations and movable along storage racks, comprising:

a control panel of a portable size which is to be handled by a crane operator for operating the crane at a suitable distance therefrom, said control panel being removably installed on the crane at a position suitable for direct access of the crane operator at a ground site, said control panel having an interlock release switch located at a position that is accessible only when the control panel is removed from the crane, and said control panel being inoperative to move the crane unless an interlock is released by the interlock release switch.

2. A safety arrangement for an automatic warehousing facility as set forth in claim 1, wherein:

said crane has a recessed portion for removably receiving said control panel, said control panel has a side which is hidden from sight when the control panel is received in the recessed portion, and an interlock release switch is provided on said side.

3. A safety arrangement for an automatic warehousing facility as set forth in claim 1, further comprising:

switch means for switching the mode of operation of the crane from an automatic operation mode to an inspection mode and vice versa,.

said crane being movable through control of said control panel only when said switch means is operated for changeover to the inspection mode and when the interlock release switch is operated to release the interlock.

4. A safety arrangement for an automatic warehousing facility as set forth in claim 3, wherein said interlock release switch is set to an interlock position when the operator manipulates the switch and is adapted to reset to a re-interlock position when the operator takes his manipulating finger off the switch.

5. A safety arrangement for an automatic warehousing facility as set forth in claim 3, wherein:

said safety arrangement includes a main control board disposed at a ground site and switchable by means of a key switch from a rest position to an operative position, said switch means being operable for switching by a key.

* * * * *